United States Patent [19]

Higuchi et al.

[11] 4,340,403

[45] Jul. 20, 1982

[54] CERAMIC HONEYCOMB FILTER

[75] Inventors: Noboru Higuchi; Teruo Yano, both of Nagoya; Masahiro Ohnishi, Kuwana, all of Japan

[73] Assignee: NGK Insulators, Ltd., Japan

[21] Appl. No.: 197,025

[22] Filed: Oct. 15, 1980

[30] Foreign Application Priority Data

Aug. 28, 1980 [JP] Japan .................... 55-117737

[51] Int. Cl.³ .............. B01D 39/20; B32B 3/12; C04B 21/06
[52] U.S. Cl. .............. 55/523; 55/DIG. 30; 60/311; 210/510; 428/117; 106/104; 501/80
[58] Field of Search .......... 55/523, DIG. 30; 252/477 R; 106/40 R, 104; 60/311; 422/180; 210/510; 428/117, 116; 501/80

[56] References Cited

U.S. PATENT DOCUMENTS

| | | |
|---|---|---|
| 3,549,468 | 12/1970 | Messineo et al. .............. 428/117 |
| 3,824,105 | 7/1974 | Capellman et al. ............ 106/104 |
| 4,041,591 | 8/1977 | Noll et al. ................... 428/117 |
| 4,041,592 | 8/1977 | Kelm ........................ 428/117 |
| 4,264,346 | 4/1981 | Mann ........................ 55/523 |
| 4,276,071 | 6/1981 | Outland ..................... 55/523 |
| 4,293,357 | 10/1981 | Higuchi et al. .............. 55/523 |
| 4,297,140 | 10/1981 | Paisley ..................... 264/261 |
| 4,300,953 | 11/1981 | Lachman .................... 501/112 |

*Primary Examiner*—David L. Lacey
*Attorney, Agent, or Firm*—Stevens, Davis, Miller & Mosher

[57] ABSTRACT

The disclosed ceramic honeycomb filter comprises a ceramic honeycomb structural body with a multiplicity of parallel channels extending therethrough, selected channels being sealed at one ends thereof by sealing material while the remainder of the channels being sealed at opposite ends thereof by said sealing material in such a manner that, as dust-containing gas flows therethrough from said one ends to said opposite ends, the gas passes through walls between adjacent channels where the dust particles are collected. Said sealing material is alumina cement containing not more than 27% by weight of calcium oxide (CaO), or a mixture of the alumina cement and aggregates.

3 Claims, 5 Drawing Figures

CERAMIC HONEYCOMB FILTER

BACKGROUND OF THE INVENTION

1. Field of the Invention

This invention relates to a ceramic honeycomb filter for removing floating fine particles from exhaust gas, and more particularly to a small ceramic honeycomb filter having excellent heat resistivity and a large filtering area.

2. Description of the Prior Art

Various conventional filters have been used for removing floating particles from gas; for instance, a filter with filler such as adsorbing material or the like arranged therein, steel wool, ceramic fibers, porous porcelain, and other porous materials. In the case of filters to remove fine particles, means for making the filtering meshes small are used in order to increase removing efficiency thereof, but such means result in a disadvantage that the pressure loss therein becomes large when a high filtration rate is required. Moreover, the structure of the conventional filters is limited to comparatively simple ones, e.g., sheet-formed, plate-formed, or cylindrical filter, and filters of corrugated structure and double cylindrical form are used in order to make their filtering areas large. However, it has been difficult to remarkably increase the filtering areas of the conventional filters. Thus, to avoid the large pressure loss, a filter of large volume is inevitable, and it has been very difficult to make a small filter.

On the other hand, a honeycomb structural body has widely been used as a carrier of catalyst to clean automobile exhaust gas, a heat exchanger of gas turbine or the like. The honeycomb structural body has noticeable advantages in that fluid pressure loss therethrough is low because a multiplicity of parallel channels of certain configuration are uniformly disposed therein, that the surface area per unit volume thereof is large, and that partition walls between the adjacent channels can be made thin to allow easy heat-up thereof. The actual application of the honeycomb structural body, however, has been limited to heat exchangers and catalyst carriers. In the case of the catalyst carrier, suitable catalyst is coated on the thin partition walls of numerous channels, so as to remove noxious gases such as carbon monoxide (CO), hydrocarbons, ($HC_n$), nitrogen oxides (NOx), etc.

It has been proposed to make a ceramic honeycomb filter by forming a honeycomb structural body having numerous channels with porous ceramic material, sealing selected channels at one ends thereof while sealing the remainder of the channels at the opposite ends thereof in such a manner that dust-containing gas flows therethrough from said one ends to the opposite ends. Since every channel which is open at said one end is closed at the said opposite end, the gas has to pass through the partition walls. Thereby, one can obtain a filter having a large effective filtering area and a low pressure loss.

Accordingly, sealing material used in the proposed ceramic honeycomb filter should tightly adhere to the partition walls, so as to prevent the dust-containing gas from passing through the ceramic honeycomb filter without being filtered at the aforementioned partition walls. In case of using the ceramic honeycomb filter at a high temperature, both the sealing material and the honeycomb structural body must have high heat resistances.

As a sealing material having a high heat resistance and a high adhesiveness, alumina cement has advantages in that it hardens at room temperature due to hydration of calcium aluminate and that it adheres so strongly that a ceramic honeycomb filter can be produced without re-firing after the aforesaid sealing. On the other hand, the alumina cement has a shortcoming in that calcium oxide (CaO) in the alumina cement tends to corrode the partition walls of the ceramic honeycomb structural body at a high temperature, resulting in possible deterioration of heat resistance and filtering ability thereof.

SUMMARY OF THE INVENTION

Therefore, an object of the present invention is to obviate the aforesaid shortcoming of the prior art. The present invention provides a ceramic honeycomb filter having ceramic honeycomb structural body with a multiplicity of parallel channels whose ends are selectively sealed by sealing material, wherein said sealing material is alumina cement containing not more than 27% by weight of calcium oxide (CaO).

In an embodiment of the present invention, the sealing material is a mixture of alumina cement and aggregates.

Preferably, the ceramic honeycomb structural body is made of material selected from the group consisting of cordierite ceramic material and mullite ceramic material.

BRIEF DESCRIPTION OF THE DRAWINGS

For a better understanding of the invention, reference is taken to the accompanying drawings, in which.

Throughout the different views of the drawings, the numeral 1 is a ceramic honeycomb structural body, the numeral 2 is a channel, the numeral 3 is a partition wall between adjacent channels, and the numeral 4 is a plug made of sealing material.

DESCRIPTION OF THE PREFERRED EMBODIMENTS

Figure 1:
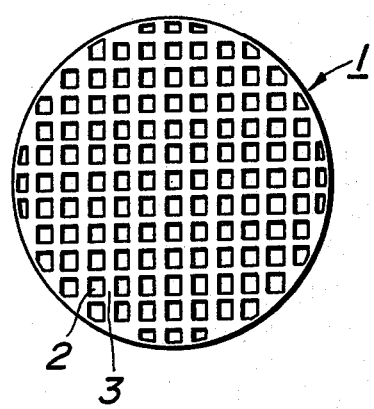
FIG. 1 is an end view of a ceramic honeycomb structural body to be used in the present invention.
Figure 2:
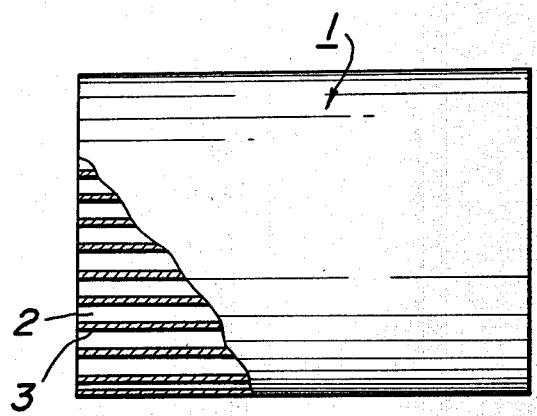
FIG. 2 is a side view of the ceramic honeycomb structural body, with a part thereof cut away.
Figure 3:
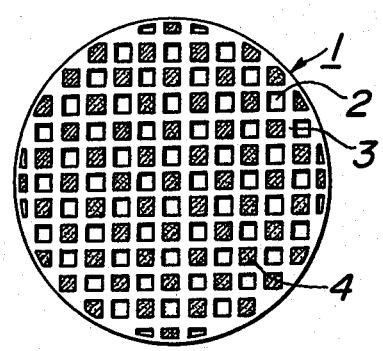
FIG. 3 is a front view showing one embodiment of a ceramic honeycomb filter according to the present invention.
Figure 4:
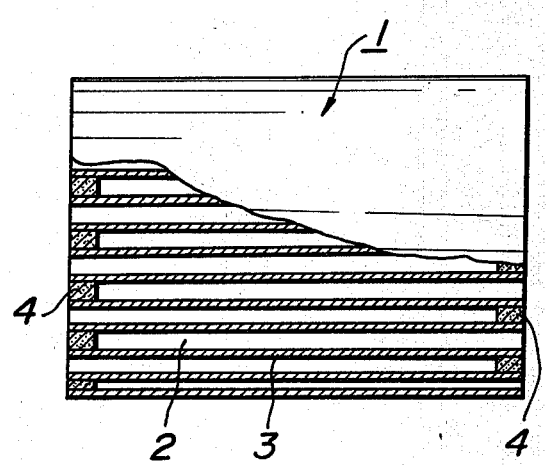
FIG. 4 is a side view of FIG. 1, with a part thereof cut away.
Figure 5:
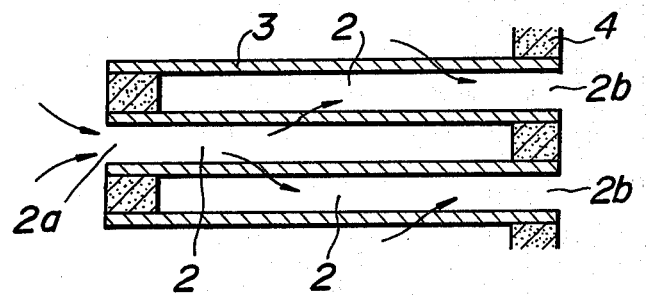
FIG. 5 is an enlarged schematic view of adjacent channels in the filter according to the invention.

Referring to FIG. 1 through FIG. 5, the ceramic honeycomb filter according to the present invention uses a ceramic honeycomb structural body 1 having a multiplicity of parallel channels 2 extending therethrough defined by partition walls 3 and uniformly disposed therein. A part of the channels, for instance, one half of the entire channels, are sealed at one ends thereof by plugs 4 made of sealing material such as alumina cement, while the remainder of the channels are sealed at the opposite ends thereof by similar plugs 4. In the example of FIG. 3 and FIG. 4, about one half of the channels are sealed at the left-hand ends thereof by the plugs 4, and the remaining half of the channels are sealed at the right-hand ends thereof by the plugs 4.

When the left-hand end of the ceramic honeycomb structural body is disposed on the entry side of dust-containing gas with the channels extending along the flowing direction of the gas, the gas enters into the channels having openings 2a at the left-hand ends thereof. The right-hand ends of the channels with the aforementioned left-hand end openings 2a are closed by the plugs 4, so that the gas passes through the partition walls 3 between adjacent channels, so that the gas leaves the filter at the right-hand end openings 2b of the adjacent channels. Thus, the partition walls 3 act as filtering members to collect floating dust particles from the gas flowing therethrough.

Accordingly, the sealing material forming the plug 4 must tightly adhere to the partition walls 3, so as to prevent the dust-carrying gas from leaving the ceramic honeycomb structural body 1 without passing through the partition walls 3 acting as the filtering members. When the ceramic honeycomb filter is used at a high temperature, both the honeycomb structural body and the sealing material forming the plug should have high heat resistances.

Methods for producing ceramic honeycomb structural bodies includes various processes, for example a paper dipping process wherein an organic porous sheet is impregnated with a ceramic slurry and a honeycomb structural body is formed and the formed body is fired, a pipe binding process wherein a large number of given shaped pipes are bound, an extrusion process wherein a batch raw material is extruded through a die provided with a large number of given shaped slits and a press process.

Explaining the production of ceramic honeycomb structural bodies by extrusion in more detail, fine powders of raw material, such as alumina, silica, mullite, silicon carbide, silicon nitride, cordierite or the like are blended with an organic binder and a plasticizer. The mixture consists mainly of ceramic raw material and is kneaded and then extruded through a die having a large number of slits capable of forming channels of a given shape in the monolith structure to be extruded, for example a polygon such as a triangle, tetragon, hexagon and the like, circle, oval and so forth. The extruded structure, so shaped, is dried and fired to obtain a porous ceramic honeycomb structural body.

The invention will now be described in further detail by referring to Examples.

EXAMPLE 1

Three kinds of alumina cement available on the market having 38.0, 27.0 and 18.0% by weight of calcium oxide (CaO), respectively, were mixed with fine granular alumina powder, so as to form cement compositions having gradually varying contents of calcium oxide (CaO), namely 38.0% by weight, 32.5% by weight, 27.0% by weight, 18.0% by weight and 9.0% by weight.

Paste-like sealing material were made by adding suitable amounts of water into the aforementioned cement compositions, respectively, and kneading the watered mixtures well.

As the ceramic honeycomb structural bodies to be sealed by the sealing materials thus prepared, fired cordierite honeycomb structural bodies were used, each of which structural bodies was 120 mm in diameter and 150 mm in length and the thickness of the partition walls thereof was 0.30 mm and the density of the channels thereof was about 200 channels per square inch of the cross section thereof.

A sheet of paper having adhesive resin impregnated onto one side surface thereof was adhered to one end surface of the ceramic honeycomb structural body where the channels thereof opened. A plurality of holes were bored on the paper by a needle at the positions of the channels to be sealed, so as to form a checker-flag pattern on the paper in the case of the illustrated example. To facilitate the sealing of the remaining channels at the opposite end of the ceramic honeycomb structural body, another sheet of paper with similar adhesive was adhered to the said opposite end of the ceramic honeycomb structural body, and holes were similarly bored on the paper to allow sealing of the channels corresponding to the holes of the paper.

One end of the ceramic honeycomb structural body with the bored paper was dipped in one of the paste-like sealing materials held in a vessel, and the sealing material was forced into the channels through the bored holes on the paper by shaking with a vibrator. The sealing material was forced into the opposite ends of the remaining channels in a similar manner.

The ceramic honeycomb structural body thus provided with the sealing material was cured in a hardening chamber at 55° C. with a humidity 90% for 2 hours, to harden the sealing material. After the sealing material was hardened, the sheets of paper and adhesive resin were removed from the opposite ends of the honeycomb structural body, so as to provide a ceramic honeycomb filter for each of the aforesaid sealing material.

At this moment, the alumina cement was already firmly adhered to the channels. Each ceramic honeycomb filter thus obtained was left to standstill for about 24 hours, and thereafter heat treated in an electric furnace at a predetermined temperature of 1,100° C. to 1,400° C. for 24 hours. Upon completion of the heat treatment, possible changes at the sealed portions due to high-temperature reactions between the partition walls and the cement during the heat treatment were checked by observation with the naked eye. The adhering strengths of the sealed portions of those samples which were found to be free from the aforementioned high-temperature reactions were measured by a push-pull scale.

Table 1 shows the result of the observation and measurement.

TABLE 1

| CaO amount in alumina cement (% by weight) | Kind of ceramic honeycomb structural body | Corrosive state of partition wall after heat treatment | | | | Adhering strength after heat treatment | | |
|---|---|---|---|---|---|---|---|---|
| | | 1,100° C. | 1,200° C. | 1,300° C. | 1,400° C. | 1,100° C. | 1,200° C. | 1,300° C. |
| 38.0 | cordierite | A | C | C | C | 140 | — | — |
| | mullite | A | B | C | C | 150 | — | — |
| 32.5 | cordierite | A | B | C | C | 130 | — | — |
| 27.0 | cordierite | A | A | C | C | 125 | 150 | — |
| | mullite | A | A | A | B | 120 | 145 | 160 |

TABLE 1-continued

| CaO amount in alumina cement (% by weight) | Kind of ceramic honeycomb structural body | Corrosive state of partition wall after heat treatment | | | | Adhering strength after heat treatment | | |
|---|---|---|---|---|---|---|---|---|
| | | 1,100° C. | 1,200° C. | 1,300° C. | 1,400° C. | 1,100° C. | 1,200° C. | 1,300° C. |
| 18.0 | cordierite | A | A | B | C | 130 | 160 | — |
| 9.0 | cordierite | A | A | B | C | 130 | 150 | — |

Explanation of the symbols in the table:
A: No corrosion was observed on the partition wall.
B: Some corrosion was observed on the partition wall.
C: Considerable corrosion was observed on the partition wall.

EXAMPLE 2

Sealing materials of different chemical compositions were prepared by using different combinations of alumina cements containing 38% by weight and 27.0% by weight of calcium oxide (CaO); aggregates consisting of synthesized mullite powder passed through 125 μm screen or 250 μm screen; and separately prepared aggregates consisting of cordierte ceramic powder passed through 149 μm screen. Ceramic honeycomb structural bodies were prepared by using cordierite ceramics materials. A number of ceramic honeycomb filters were made by using the honeycomb structural bodies thus prepared by the process of Example 1.

Corrosive states and adhering strength of the sealing materials in the ceramic honeycomb filters thus made were checked by observation and measured in the same manner as that of Example 1.

Table 2 shows the result of the observation and measurement.

gines. Moreover, if the ceramic honeycomb filter according to the invention is disposed upstream of a ceramic honeycomb substrate carrying catalysts for removing carbon monoxide (CO), hydrocarbons ($HC_n$) and nitrogen oxides (NOx) and the like, the filter effectively prevents the ceramic honeycomb substrate from clogging. Furthermore, fine particles collected in the filtering portions of the ceramic honeycomb filter, e.g., dust and carbon particles, are burnt by the very hot exhaust gas into carbon monoxide (CO), hydrocarbons ($HC_n$) or nitrogen oxides (NOx) which are caught by the catalyst, so that the ceramic honeycomb filter according to the invention can be used continuously for a long period of time without necessitating any special cleaning.

Thus, the present invention contributes greatly to development of the industry.

What is claimed is:

1. A ceramic honeycomb filter having ceramic honeycomb structural body with channels whose ends are

TABLE 2

| CaO amount in alumina cement (% by weight) | Kind of ceramic honeycomb structural body | Contents of aggregate | | cement/ aggregate (weight) ratio | Corrosive state of partition wall after heat treatment | | | | Adhering strength after heat treatment (kg/cm) | | |
|---|---|---|---|---|---|---|---|---|---|---|---|
| | | kind | grain size | | 1,100° C. | 1,200° C. | 1,300° C. | 1,400° C. | 1,100° C. | 1,200° C. | 1,300° C. |
| 38.0 | Cordierite | mullite | less than 125 μm | 100/200 | A | A | C | C | 120 | 120 | — |
| | | mullite | less than 250 μm | 100/200 | A | A | C | C | 110 | 120 | — |
| | | cordierite | less than 149 μm | 100/200 | A | A | C | C | 110 | 100 | — |
| 27.0 | cordierite | mullite | less than 125 μm | 100/200 | A | A | A | B | 120 | 130 | 140 |
| | | mullite | less than 250 μm | 100/200 | A | A | A | B | 110 | 125 | 145 |
| | | cordierite | less than 149 μm | 100/200 | A | A | A | B | 110 | 120 | 135 |

Explanation of the symbols in the table:
A: No corrosion was observed on the partition wall.
B: Some corrosion was observed on the partition wall.
C: Considerable corrosion was observed on the partition wall.

As apparent from the above Examples, the use of alumina cement as a sealing material provides an advantage in that firm adhesion of the sealing material to the partition walls can be obtained without firing. In addition, when alumina cement containing not more than 27% of calcium oxide (CaO), preferably together with suitable aggregates, is used as sealing material, it is possible to obtain a ceramic honeycomb filter having high heat resistance and high filtering ability and free from corrosion of the partition wall even at a high temperature in excess of 1,200° C. Thus, the ceramic honeycomb filter according to the invention is very effective in removing fine soot particles in very hot exhaust gas from Diesel engines and other internal combustion engines.

selectively sealed by sealing material comprising alumina cement containing calcium oxide (CaO), wherein said alumina cement contains not more than 27% by weight of said calcium oxide (CaO).

2. A ceramic honeycomb filter as set forth in claim 1, wherein said sealing material comprises a mixture of said alumina cement and aggregates.

3. A ceramic honeycomb filter as set forth in one of claims 1 or 2 wherein said ceramic honeycomb structural body is made of material selected from the group consisting of cordierite ceramic material and mullite ceramic material.

* * * * *